(12) United States Patent
Adachi et al.

(10) Patent No.: US 10,735,912 B2
(45) Date of Patent: Aug. 4, 2020

(54) RADIO TERMINAL

(71) Applicant: KYOCERA CORPORATION, Kyoto (JP)

(72) Inventors: Hiroyuki Adachi, Kawasaki (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 154 days.

(21) Appl. No.: 15/751,222

(22) PCT Filed: Aug. 5, 2016

(86) PCT No.: PCT/JP2016/073172
§ 371 (c)(1),
(2) Date: Feb. 8, 2018

(87) PCT Pub. No.: WO2017/026408
PCT Pub. Date: Feb. 16, 2017

(65) Prior Publication Data
US 2018/0234808 A1 Aug. 16, 2018

(30) Foreign Application Priority Data

Aug. 12, 2015 (JP) ................................ 2015-159480

(51) Int. Cl.
*H04W 4/06* (2009.01)
*H04W 8/24* (2009.01)
*H04W 72/04* (2009.01)
*H04W 88/04* (2009.01)
*H04B 7/155* (2006.01)

(52) U.S. Cl.
CPC ............... *H04W 4/06* (2013.01); *H04W 8/24* (2013.01); *H04W 72/0453* (2013.01); *H04B 7/15528* (2013.01); *H04W 88/04* (2013.01)

(58) Field of Classification Search
None
See application file for complete search history.

(56) References Cited

U.S. PATENT DOCUMENTS

| 9,439,171 B2 | 9/2016 | Phan et al. |
| 10,070,413 B2 | 9/2018 | Phan et al. |
| 10,455,548 B2 | 10/2019 | Phan et al. |

(Continued)

FOREIGN PATENT DOCUMENTS

| JP | 2014-528192 A | 10/2014 |
| WO | 2014/051126 A1 | 4/2014 |
| WO | 2015/017188 A1 | 2/2015 |

OTHER PUBLICATIONS

International Search Report issued in PCT/JP2016/073172; dated Oct. 11, 2016.

(Continued)

*Primary Examiner* — Ajit Patel
(74) *Attorney, Agent, or Firm* — Studebaker & Brackett PC

(57) ABSTRACT

A radio terminal according to one embodiment is a relay terminal configured to perform a UE-to-Network relay in a proximity service. The radio terminal comprises a controller configured to transmit, to a remote terminal configured to communicate with the relay terminal by the UE-to-Network relay, Multimedia Broadcast Multicast Service (MBMS) reception information related to whether or not the radio terminal can receive an MBMS service.

3 Claims, 13 Drawing Sheets

(56) References Cited

U.S. PATENT DOCUMENTS

| | | | |
|---|---|---|---|
| 2014/0269482 A1* | 9/2014 | Pandey | H04W 4/06 370/312 |
| 2015/0036578 A1* | 2/2015 | Wu | H04L 12/189 370/312 |
| 2015/0036579 A1* | 2/2015 | Wu | H04B 7/15 370/312 |
| 2015/0271856 A1 | 9/2015 | Tong et al. | |
| 2016/0044634 A1* | 2/2016 | Seo | H04W 76/14 370/312 |
| 2016/0198516 A1* | 7/2016 | Kim | H04W 76/14 370/312 |
| 2016/0234806 A1* | 8/2016 | Le Thierry D'Ennequin | H04W 4/06 |
| 2016/0338095 A1* | 11/2016 | Faurie | H04W 28/0278 |
| 2017/0164332 A1* | 6/2017 | Kim | H04W 40/246 |
| 2018/0027390 A1* | 1/2018 | He | H04W 4/06 370/312 |
| 2020/0053697 A1 | 2/2020 | Phan et al. | |

OTHER PUBLICATIONS

3rd Generation Partnership Project; Technical Specification Group Services and System Aspects; Proximity-based services (ProSe); Stage 2; 3GPP TS 23.303 V13.0.0; Jun. 2015; pp. 1-76; Release 13; 3GPP Organizational Partners.

3rd Generation Partnership Project; Technical Specification Group Services and System Aspects; Study on extended architecture support for proximity-based services; 3GPP TR 23.713 V1.5.0; Jul. 2015; pp. 1-83; Release 13; 3GPP Organizational Partners.

InterDigital Communications; Involvement of the eNB/MME in UE-to-Network Relays; 3GPP TSG RAN WG2 #89Bis; R2-151451; Apr. 20-24, 2015; pp. 1-5; Bratislava, Slovakia.

ZTE Corporation; SAI broadcast; 3GPP TSG—SA WG2 Meeting #110; S2-152357; Jul. 6-10, 2015; 9 pages; Dubrovnik, Croatia.

* cited by examiner

```
MasterInformationBlock-SL
-- ASN1START
MasterInformationBlock-SL  ::=    SEQUENCE {
    S1-Bandwidth-r12              ENUMERATED {
                                    n6, n15, n25, n50, n75, n100},
    tdd-ConfigSL-r12              TDD-ConfigSL-r12
    directFrameNumber-r12         BIT STRING (SIZE (10)),
    directSubframeNumber-r12      INTEGER (0..9),
    inCoverage-r12                BOOLEAN,
    reserved-r12                  BIT STRING (SIZE (19))
}
-- ASN1STOP
```

1 #2 #3 #4 ... #18 #19
 0   0   0   0       0   1

LAST1 BIT INDICATES "MBMS AVAILABILITY"

0: MBMS IS NOT AVAILABLE
1: MBMS IS AVAILABLE

RADIO TERMINAL

TECHNICAL FIELD

The present application relates to a radio terminal used in a communication system.

BACKGROUND ART

In 3GPP (3rd Generation Partnership Project), which is a project aiming to standardize a mobile communication system, the specifications of a proximity service (ProSe: Proximity-based Services) have been designed. The ProSe includes UE-to-Network relay in which a relay UE (ProSe UE-to-Network Relay) relays data (traffic) of a remote UE outside the network (Remote UE) between a remote UE and the network (Non Patent Document 1).

Here, relaying MBMS traffic to a remote UE by UE-to-Network relay has been considered (Non Patent Document 2).

PRIOR ART DOCUMENT

Non-Patent Document

Non Patent Document 1: 3GPP Technical report "TS 23.303 V13.0.0" Jun. 21, 2015
Non Patent Document 2: 3GPP Technical report "TR 23.713 V1.5.0" Jul. 28, 2015

SUMMARY

A radio terminal according to one embodiment is a relay terminal configured to perform a UE-to-Network relay in a proximity service. The radio terminal comprises a controller configured to transmit, to a remote terminal configured to communicate with the relay terminal by the UE-to-Network relay, Multimedia Broadcast Multicast Service (MBMS) reception information related to whether or not the radio terminal can receive an MBMS service.

DESCRIPTION OF THE EMBODIMENT

[Overview of Embodiment]

Figure 1:
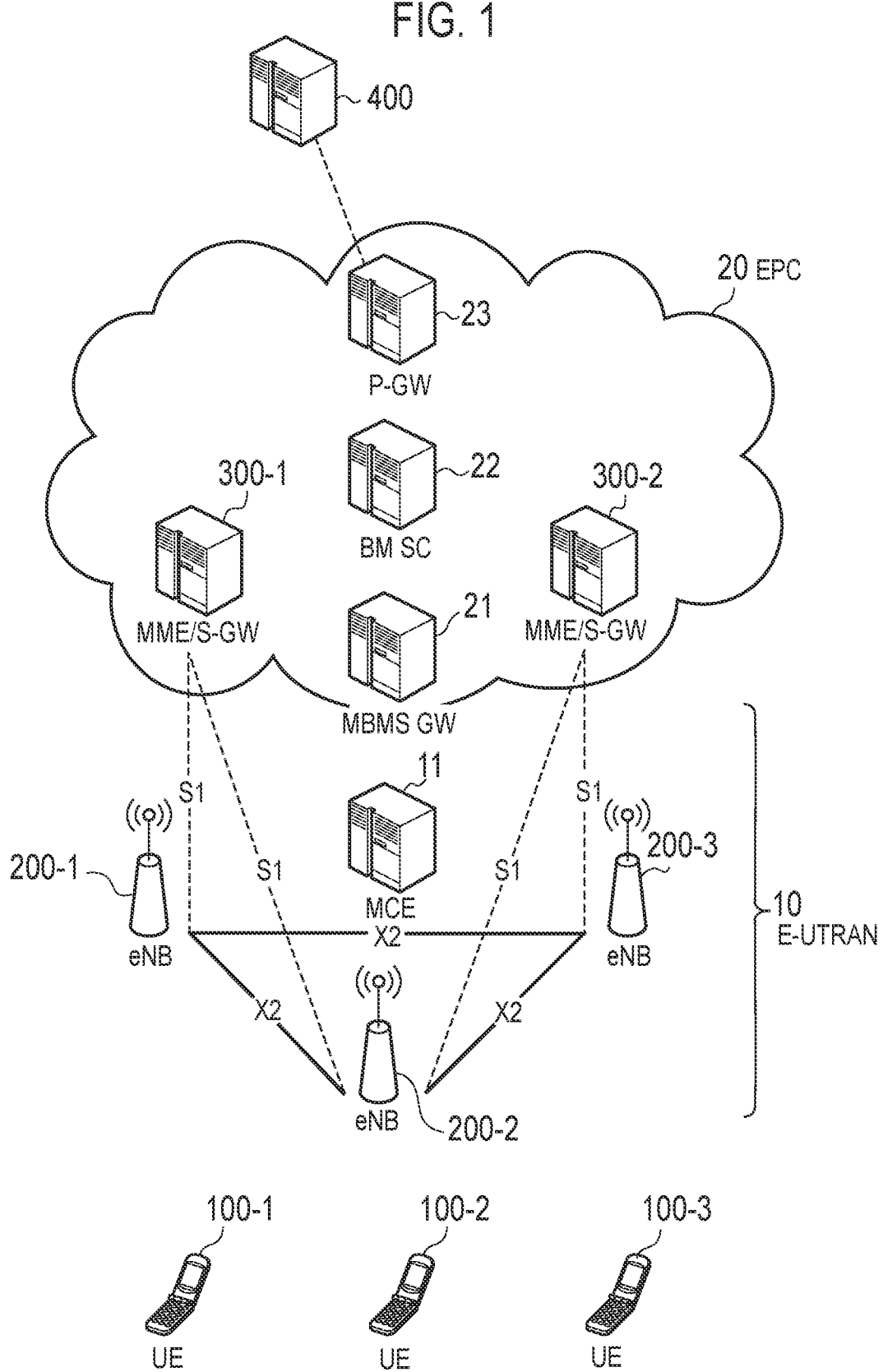
FIG. 1 is a diagram illustrating a configuration of an LTE system.

In the following embodiments, an object is to reduce unnecessary signaling when relaying MBMS traffic to a remote UE by UE-to-Network relay.

A radio terminal according to the embodiment is a relay terminal configured to perform a UE-to-Network relay in a proximity service. The radio terminal comprises a controller configured to transmit, to a remote terminal configured to communicate with the relay terminal by the UE-to-Network relay, Multimedia Broadcast Multicast Service (MBMS) reception information related to whether or not the radio terminal can receive an MBMS service.

In the embodiment, the controller is configured to transmit the MBMS reception information indicating that the MBMS service cannot be received, if a serving cell of the radio terminal does not provide the MBMS service.

In the embodiment, the controller is configured to transmit the MBMS reception information indicating that the MBMS service cannot be received, if another cell different from the serving cell does not provide the MBMS service.

In the embodiment, the controller is configured to transmit the number of predetermined identifiers received by the radio terminal as the MBMS reception information. Each of the predetermined identifiers is at least one of an identifier for identifying the MBMS service and an identifier for identifying an area for distributing the MBMS service.

In the embodiment, the controller is configured to transmit, as the MBMS reception information, information on a frequency band which the radio terminal can monitor, the frequency band being for providing an MBMS service.

In the embodiment, the controller is configured to transmit, to a base station that manages a serving cell, capability information related to whether or not the MBMS service provided in a frequency band different from that of the serving cell can be received.

In the embodiment, the controller is configured to receive a reception request of a specific MBMS service from the remote UE. The controller is configured to transmit, instead of a response to the reception request, a message including a first identifier for identifying the specific MBMS service and a second identifier used for transmitting the specific MBMS service, by broadcast.

In the embodiment, the controller is configured to include, into the message, a timer to be a trigger of a reception request of the specific MBMS service.

In the embodiment, the second identifier is an identifier having information amount less than that of a destination identifier used for data transmission in the proximity service.

In the embodiment, the controller is configured to us a common identifier as an identifier of a transmission source, if transmitting an identifier for identifying each of a plurality of specific MBMS services.

In the embodiment, the controller is configured to request a base station to provide a radio resource for relaying the MBMS service, if a relay of the MBMS service is requested from the remote terminal.

In the embodiment, the controller is configured to receive, from the base station, allocation information of a radio resource that is available for a longer duration than a radio resource for relaying data by the UE-to-Network relay.

In the embodiment, the controller is configured to receive, from a base station, a transmission resource pool for transmitting MBMS traffic.

In the embodiment, the controller is configured to receive, from the base station, a transmission resource pool associated with each MBMS traffic as the transmission resource pool.

EMBODIMENTS (Communication System)

Figure 2:
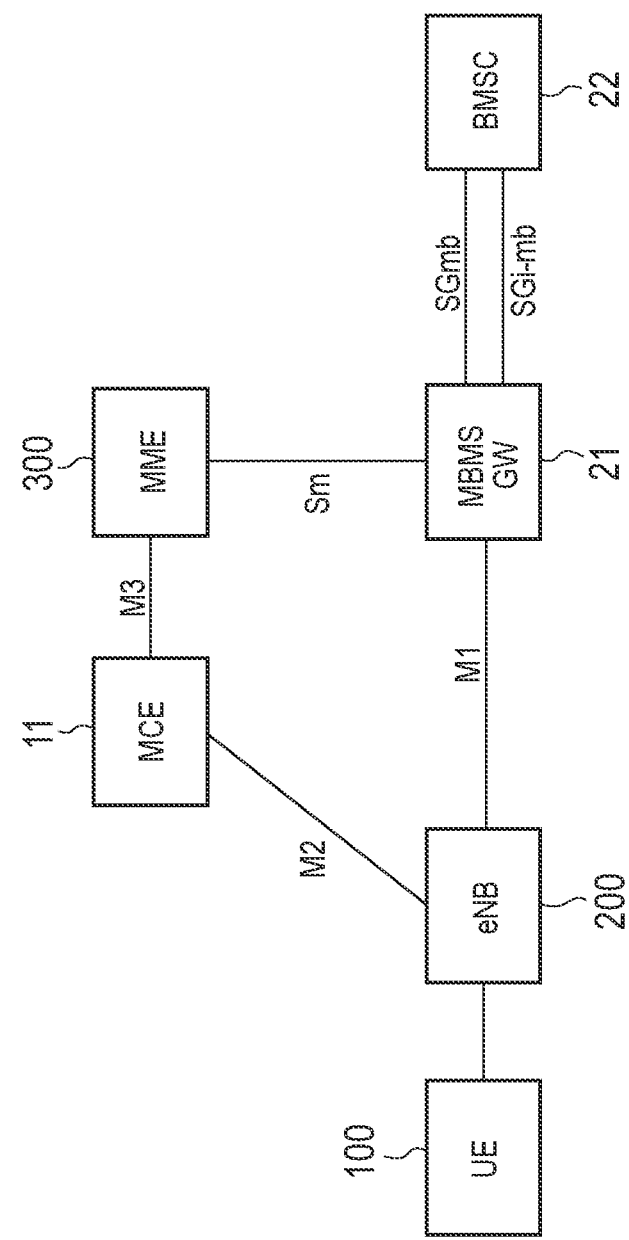
FIG. 2 is a diagram illustrating a network configuration for MBMS/eMBMS.

Hereinafter, an LTE system which is the mobile communication system according to the embodiments will be described below. FIG. 1 is a diagram illustrating a configuration of the LTE system according to the embodiments. FIG. 2 is a diagram illustrating a configuration of a network according to MBMS/eMBMS according to the embodiments.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. Further, a server 400 is provided in an external network that is not managed by an operator of the cellular network.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network of the LTE system.

Moreover, the E-UTRAN 10 includes an MCE (Multi-Cell/Multicast Coordinating Entity) 11. The MCE 11 is connected to the eNB 200 via a M2 interface and is connected to the MME 300 via a M3 interface (See FIG. 2). The MCE 11 performs MBSFN radio resource management/allocation and the like.

The EPC 20 includes an MBMS GW (Multimedia Broadcast Multicast Service Gateway) 21. The MBMS GW 21 is connected to the eNB 200 via a M1 interface, connected to the MME 300 via a Sm interface, and connected to a BM-SC 22 via a SG-mb interface and a SGi-mb interface (See FIG. 2). The MBMS GW 21 performs IP multicast data transmission and session control to the eNB 200.

The EPC 20 also includes a BMSC (Broadcast Multicast Service Center) 22. The BMSC 22 is connected to the MBMS GW 21 via the SG-mb and SGi-mb interfaces, and is connected to the P-GW 23 via the SGi interface (See FIG. 2). The BMSC 22 mainly manages and allocates TMGI (Temporary Mobile Group Identity).

The EPC 20 also includes a P-GW 23. The P-GW 23 performs control to relay the user data from the external network (and to the external network). The P-GW 23 is connected to the Server 400.

Server 400 is a ProSe application server (ProSe Application Server). In this case, the Server 400 manages identifiers used in ProSe. For example, the Server 400 stores "EPC ProSe user ID" and "ProSe function ID". Further, the Server 400 maps "application layer user ID" and "EPC ProSe user ID".

(Configuration of Radio Protocol)

Figure 3:
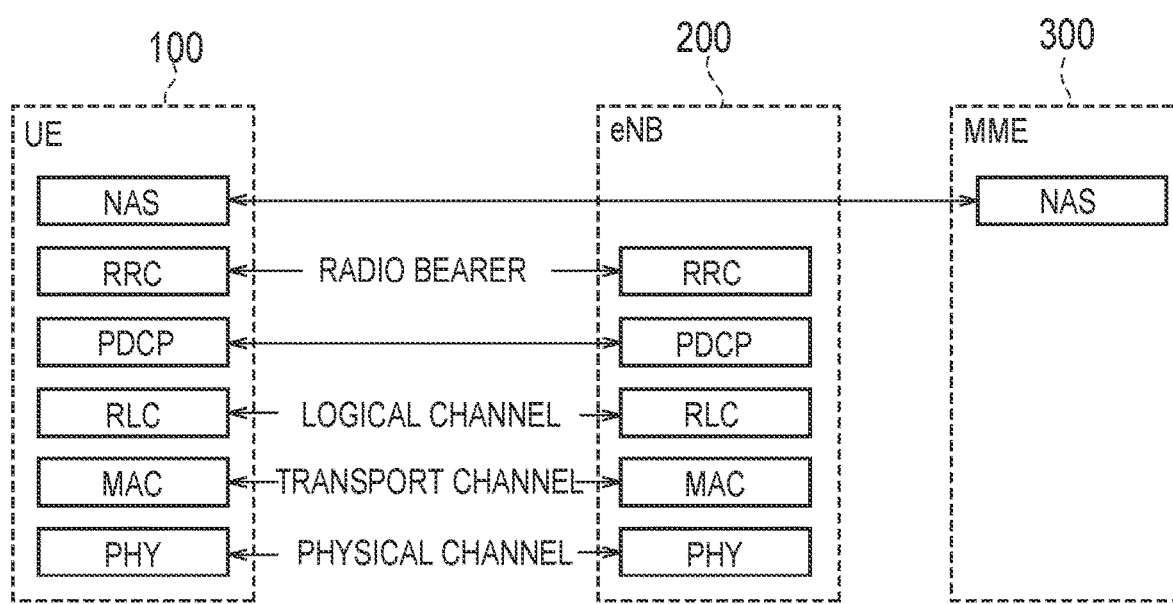
FIG. 3 is a protocol stack diagram of a radio interface in the LTE system.

FIG. 3 is a protocol stack diagram of a radio interface in the LTE system.

As illustrated in FIG. 3, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state (RRC connected mode), otherwise the UE 100 is in an RRC idle state (RRC idle mode).

A NAS (Non-Access Stratum) layer positioned above the RRC layer performs a session management, a mobility management and the like.

(Channel Configuration of Downlink)

Figure 4A:
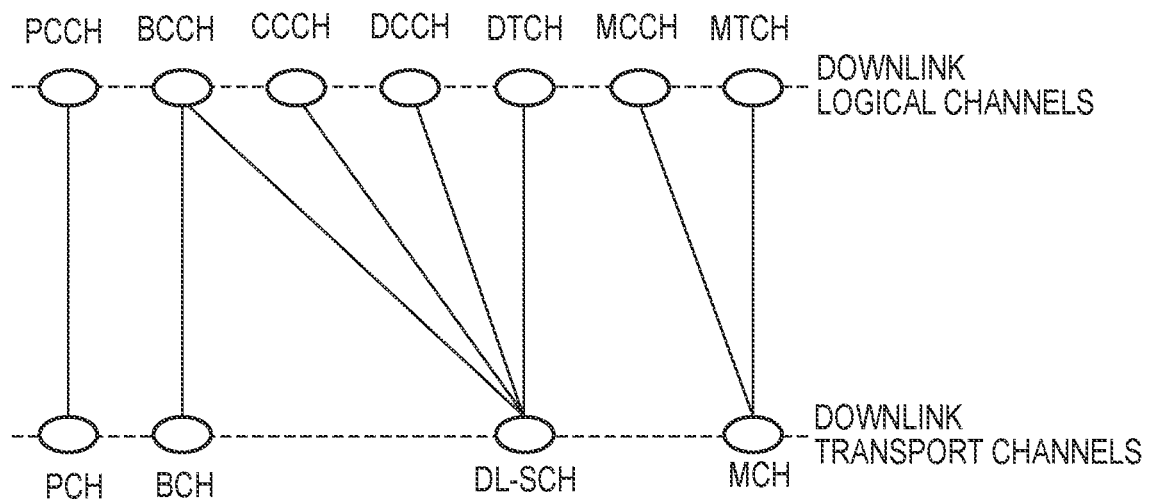
FIGS. 4A and 4B are diagrams illustrating a channel configuration of downlink in the LTE system.
Figure 4B:
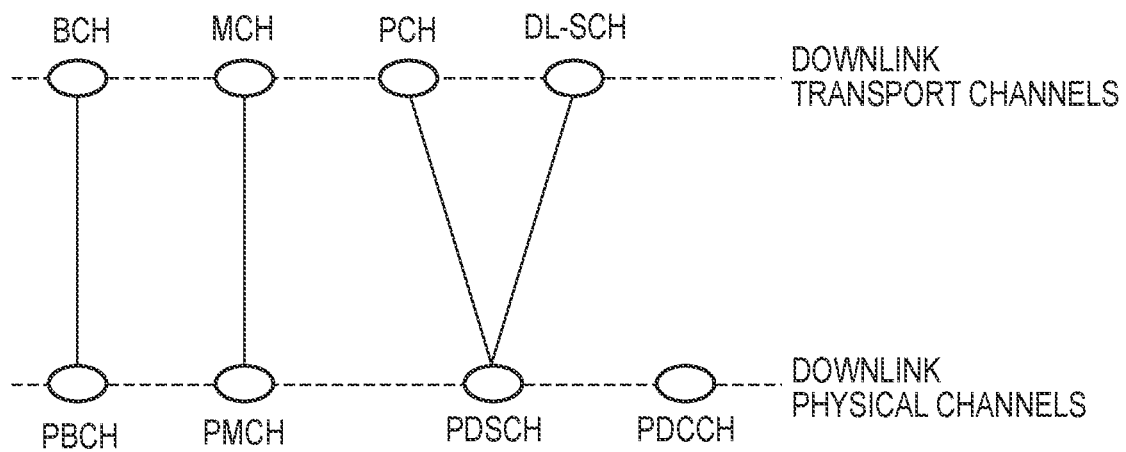

FIGS. 4A and 4B are diagrams illustrating a channel configuration of downlink in the LTE system.

FIG. 4A illustrates mapping between a logical channel (Downlink Logical Channel) and a transport channel (Downlink Transport Channel).

As illustrated in FIG. 4A, PCCH (Paging Control Channel) is a logical channel for notifying paging information and system information change. The PCCH is mapped to PCH (Paging Channel) that is a transport channel.

BCCH (Broadcast Control Channel) is a logical channel for broadcast system information. The BCCH is mapped to BCH (Broadcast Control Channel) or DL-SCH (Downlink Shared Channel), both of which are transport channels.

CCCH (Common Control Channel) is a logical channel for transmission control information between the UE 100 and the eNB 200. The CCCH is used if the UE 100 has no RRC connection with the network. The CCCH is mapped to the DL-SCH.

DCCH (Dedicated Control Channel) is a logical channel for transmitting individual control information between the UE 100 and the network. The DCCH is used if the UE 100 has an RRC connection. The DCCH is mapped to the DL-SCH.

DTCH (Dedicated Traffic Channel) is an individual logical channel for transmitting data. The DTCH is mapped to the DL-SCH.

MCCH (Multicast Control Channel) is a logical channel for one-to-multi (multicast/broadcast) transmission. The MCCH is used for transmitting MBMS control information for MTCH from the network to the UE 100. The MCCH is used only by a UE 100 receiving MBMS or being interested in receiving MBMS. The MCCH is mapped to MCH (Multicast Channel) that is a transport channel.

MTCH (Multicast Traffic Channel) is a logical channel for one-to-multi (multicast/broadcast) data transmission from the network to the UE 100. The MTCH is used only by a UE 100 configured to receive MBMS. The MTCH is mapped to the MCH.

FIG. 4B illustrates mapping between a transport channel (Downlink Transport Channel) and a physical channel (Downlink Physical Channel).

As illustrated in FIG. 4B, the BCH is mapped to PBCH (Physical Broadcast channel).

The MCH is mapped to PMCH (Physical Multicast Channel). The MCH is broadcast to a whole coverage area of a cell. The MCH supports MBSFN transmission by a plurality of cells.

The PCH and the DL-SCH are mapped to PDSCH (Physical Downlink Shared Channel). The DL-SCH supports HARQ, a link adaptation, and a dynamic resource allocation.

PDCCH carries resource allocation information of the PDSCH (DL-SCH, PCH), HARQ information on the DL-SCH, and the like. Further, the PDCCH carries an uplink scheduling grant.

(Configuration of Radio Frame)

Figure 5:
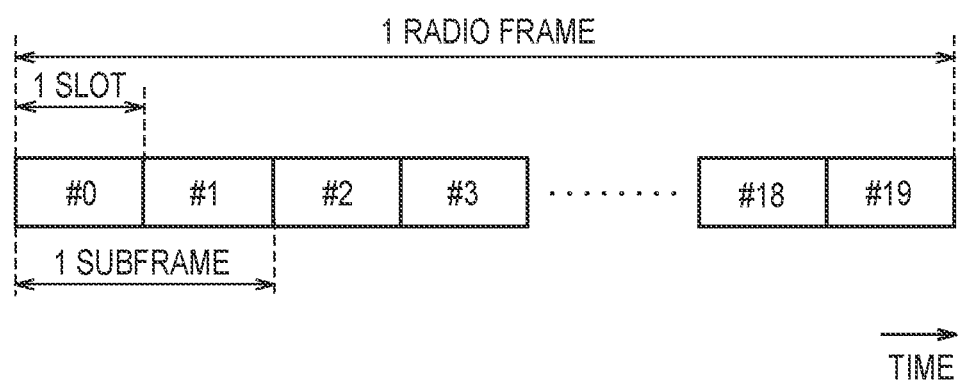
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a PDCCH for mainly transmitting a control signal. Furthermore, the other portion of each subframe is a region available as a PDSCH for mainly transmitting downlink data. Furthermore, in each subframe, a downlink reference signal such as a cell specific reference signal (CRS) is arranged.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data. Further, in the downlink, an MBSFN subframe, which is a subframe for MBSFN transmission, may be configured.

(Overview of MBMS)

An overview of MBMS will be described, below. The LTE system supports the MBMS (Multimedia Broadcast Multicast Service). In the MBMS, the UE 100 (an MBMS-compliant UE) receives a multimedia content (MBMS service) distributed by multicast or by broadcast from a network. The UE 100 can receive MBMS data not only in the RRC connected state but also in the RRC idle state.

One MBSFN (Multicast-Broadcast Single-Frequency Network) area is configured by a plurality of cells, and an MBMS service area is configured by a plurality of MBSFN areas. One cell can belong to the plurality of MBSFN areas.

The BMSC 22 provides a function of distributing MBMS data. The MBMS GW 21 broadcasts MBMS data to each eNB 200. The MCE 11 controls a radio resource used by each eNB 200 within the same MBSFN area or sets an MBSFN subframe, for example.

(Proximity Service)

A proximity service (ProSe: Proximity-based Services) will be described below. In the ProSe, a plurality of UEs 100 transmit and receive various types of signals via a direct radio link that does not pass through the eNB 200. The direct radio link in ProSe is called a "Sidelink".

The "Sidelink" is a UE-to-UE interface for direct discovery and direct communication. The "Sidelink" corresponds to a PC5 interface. The PC5 is a reference point between UEs capable of using the control for UE-to-Network relay based on direct discovery, direct communication, and proximity service, and the proximity service used for a user plane. The PC5 interface is a UE-to-UE interface in the ProSe.

Two modes, namely "Direct Discovery" and "Direct Communication" are defined as modes of the ProSe.

The Direct Discovery is a mode of searching a partner destination by directly transmitting, between UEs, a discovery signal that does not specify a specific destination. Further, the Direct Discovery is a procedure for discovering another UE in the proximity of a UE by using a direct radio signal in E-UTRA (Evolved Universal Terrestrial Radio Access) via the PC5. Alternatively, the Direct Discovery is a procedure employed by a UE 100 capable of executing the proximity service for discovering another UE 100 capable of executing the proximity service by using only the capability of the two UEs 100 with the help of the E-UTRA technology. The Direct Discovery is supported only if a service is provided to the UE 100 by the E-UTRAN (eNB 200 (cell)). The service can be provided by the E-UTRAN if the UE 100 is either connected to the cell (eNB 200), or exists in the cell.

The resource allocation types for the transmission (announcement) of a discovery signal (discovery message)

include "Type 1" in which the UE 100 selects a radio resource, and "Type 2 (Type 2B)" in which the eNB 200 selects a radio resource.

A "Sidelink Direct Discovery" protocol stack includes a physical (PHY) layer, a MAC layer, and a ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The Direct Communication is a mode in which data is directly transmitted between UEs by specifying a specific destination (destination group). Further, the Direct Communication is communication performed between two or more UEs capable of executing the proximity service through user plane transmission using the E-UTRA technology via a path that does not pass through any network node.

The resource allocation types of the Direct Communication include "Mode 1" in which the eNB 200 specifies a radio resource of the Direct Communication, and "Mode 2" in which the UE 100 selects a radio resource of the Direct Communication.

A Direct Communication protocol stack includes a physical (PHY) layer, a MAC layer, an RLC layer, and a PDCP layer. Between the physical layer of a UE (A) and the physical layer of a UE (B), a control signal is transmitted via a physical sidelink control channel (PSCCH), and data is transmitted via a physical sidelink shared channel (PSSCH). Further, a synchronization signal and the like may be sent via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(UE-to-Network Relay)

Figure 6:
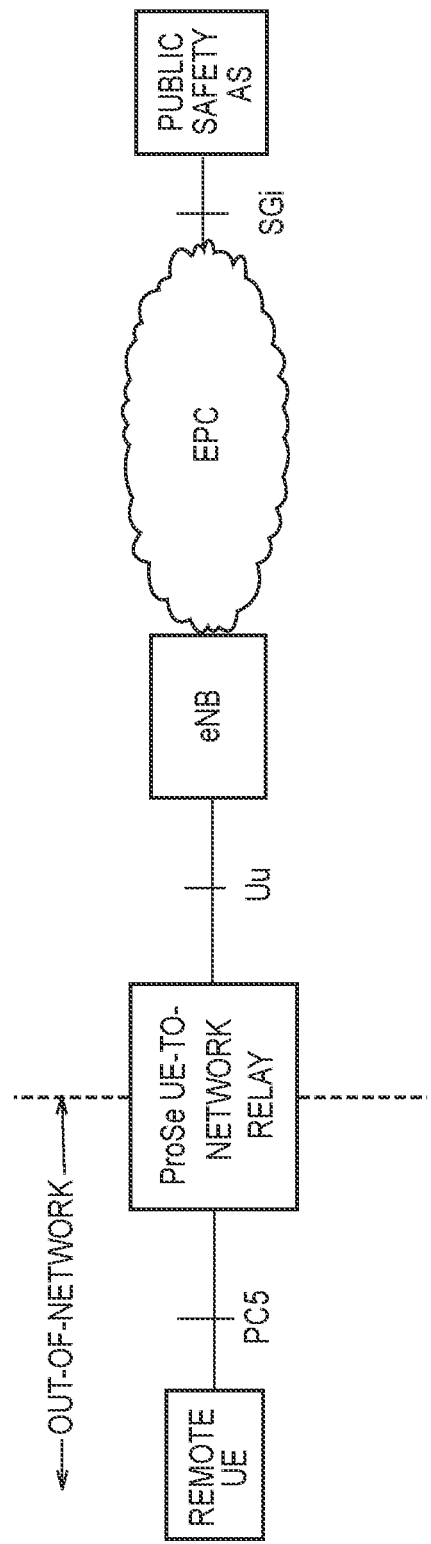
FIG. 6 is a diagram for describing a UE-to-Network relay.

Hereinafter, the UE-to-Network relay will be described by using FIG. 6. FIG. 6 is a diagram for describing the UE-to-Network relay according to the embodiment.

In FIG. 6, a remote UE is a UE located outside the network (Out-of-Network). That is, the remote UE is located outside the coverage of a cell. It is noted that the remote UE may be located within the coverage of the cell. Therefore, the remote UE is a UE 100 to which a service is not directly provided by the E-UTRAN 10 (a UE 100 which is not served by the E-UTRAN 10). Further, the remote UE 100 can communicate with a packet data network (PDN) via a relay UE described later. The remote UE may be a UE for public safety (ProSe-enabled Public Safety UE).

It is noted that the "ProSe-enabled Public Safety UE" is configured to be allowed use for public safety by an HPLMN. The "ProSe-enabled Public Safety UE" can use the proximity service, and supports the procedures in the proximity service as well as specific capability for public safety. For example, the "ProSe-enabled Public Safety UE" transmits information for public safety through the proximity service. The information for public safety includes, for example, information on disasters (such as earthquakes and fires), and information used by fire officials or police officials.

The remote UE is provided with the ProSe relay service from the relay UE, as described later. The UE-to-Network relay is executed between the remote UE that is provided with the ProSe relay service and the relay UE that provides the ProSe relay service.

The relay UE (ProSe UE-to Network Relay) provides the ProSe relay service for the remote UE. Specifically, the relay UE provides service continuity of the communication with a packet data network for the remote UE. Therefore, the relay UE relays data (unicast traffic) between the remote UE and the network. The relay UE relays data (traffic) of the remote UE through the proximity service (Direct Communication). Specifically, the relay UE relays data (uplink traffic) received from the remote UE via the PC5 interface to the eNB 200 via a Uu interface (LTE-Uu) or a Un interface (LTE-Un). Further, the relay UE relays data (downlink traffic) received from the eNB 200 via the Uu interface or the Un interface to the remote UE via the PC5 interface. The relay UE is located only within the network (within the coverage of the cell).

Further, it is possible for the relay UE to provide a comprehensive function that enables the relay of any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. Further, the relay UE can transmit data between the IP-Relay layer and the IP layer of the P-GW350.

It is noted that, in an AS layer (Access Stratum), the relay UE can transmit data (traffic) to the remote UE by using broadcast. In the AS layer, the relay UE may transmit data to the remote UE by using unicast. It is noted that if the UE-to-Network relay is executed by using broadcast, a feedback in the AS layer is not performed; however, a feedback in an NAS layer may be performed, between the relay UE and the remote UE. Further, if the UE-to-Network relay is performed by using unicast, a feedback in the AS layer may be performed.

(Radio Terminal)

Figure 7:
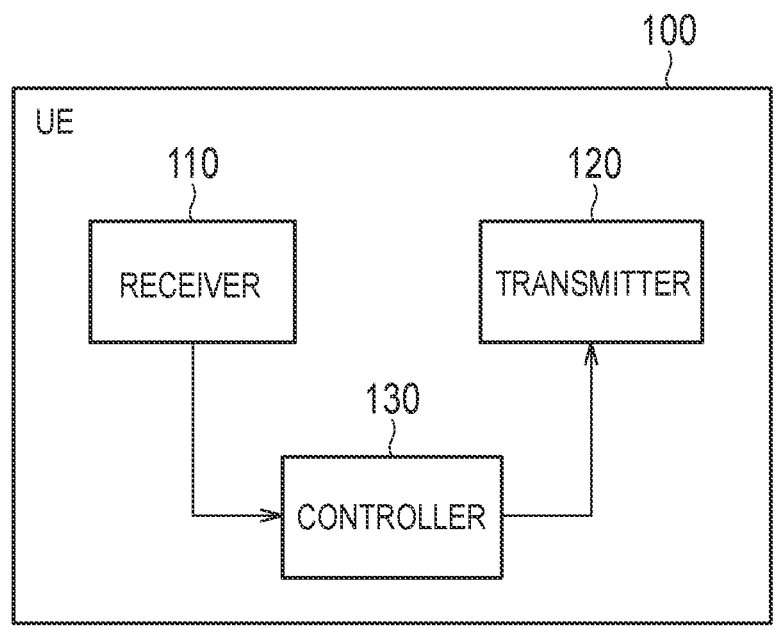
FIG. 7 is a block diagram of a UE 100.

A UE 100 (radio terminal) according to the embodiment will be described below. FIG. 7 is a block diagram of the UE 100. As illustrated in FIG. 7, the UE 100 includes a receiver 110, a transmitter 120, and a controller 130. The receiver 110 and the transmitter 120 may be unified as one in the form of a transceiver.

The receiver 110 performs various types of receptions under the control of the controller 130. The receiver 110 includes an antenna. The receiver 110 converts a radio signal received by the antenna into a baseband signal (reception signal), and outputs the baseband signal to the controller 130.

It is noted that when the UE 100 is a "ProSe-enabled Public Safety UE", the receiver 110 can simultaneously receive radio signals in two different frequencies. For example, the UE 100 has two receivers 110 (2 RX Chains). The UE 100 can receive a cellular radio signal by one receiver 110, and receive a ProSe radio signal by the other receiver 110.

The transmitter 120 performs various types of transmissions under the control of the controller 130. The transmitter 120 includes an antenna. The transmitter 120 converts a baseband signal (transmission signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor that performs modulation and demodulation, coding and decoding and the like on a baseband signal, and a CPU (Central Processing Unit) that executes the program stored in the memory to perform various types of processes. The processor may include a codec that performs coding and decoding on sound and video signals. The processor executes various types of processes described later, and various types of communication protocols described above.

The UE 100 may include a GNSS receiving equipment. The GNSS receiving equipment receives a GNSS signal in order to obtain location information indicating a geographical location of the UE 100, and outputs the received signal to the controller 130. Alternatively, the UE 100 may have a GPS function for acquiring the location information of the UE 100.

(Base Station)

Figure 8:
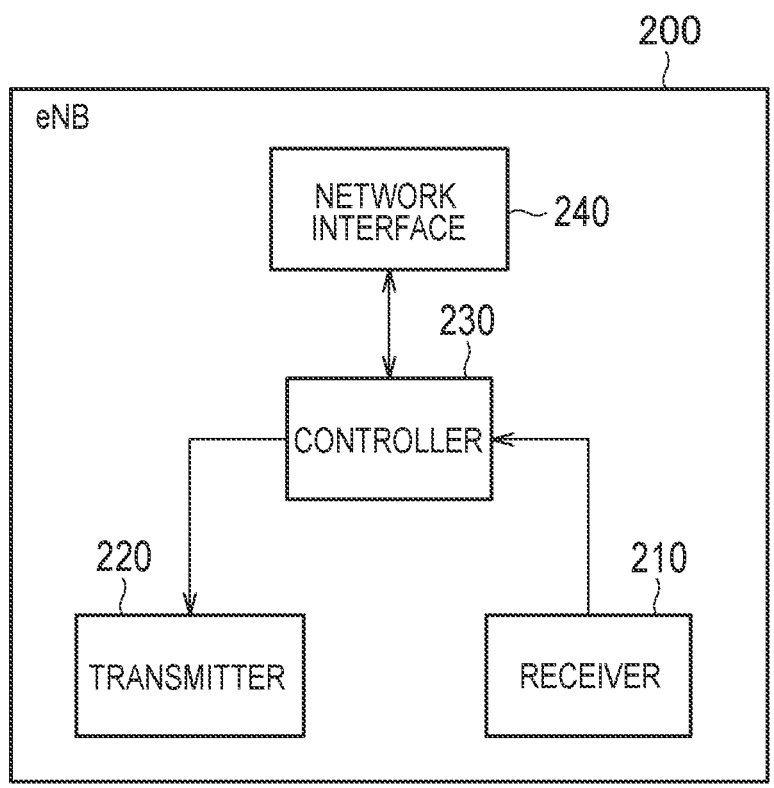
FIG. 8 is a block diagram of an eNB 200.

An eNB 200 (base station) according to the embodiment will be described below. FIG. 8 is a block diagram of the eNB 200. As illustrated in FIG. 8, the eNB 200 includes a receiver 210, a transmitter 220, a controller 230, and a network interface 240. The receiver 210 and the transmitter 220 may be unified as one in the form of a transceiver.

The receiver 210 performs various types of receptions under the control of the controller 230. The receiver 210 includes an antenna. The receiver 210 converts a radio signal received by the antenna into a baseband signal (reception signal), and outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal, and transmits the radio signal from the antenna.

The controller 230 performs various types of controls in the eNB 200. The controller 230 includes a processor and a memory. The memory stores a program to be executed by the processor, and information to be used for a process by the processor. The processor includes a baseband processor that performs modulation and demodulation, coding and decoding and the like on a baseband signal, and a CPU (Central Processing Unit) that executes the program stored in the memory to perform various types of processes. The processor executes various types of processes described later, and various types of communication protocols described above.

The network interface 240 is connected to a neighbour eNB 200 via the X2 interface and is connected to the MME/S-GW 300 via the S1 interface. The network interface 240 is used in communication performed on the X2 interface, communication performed on the S1 interface, and the like.

(Operation Environment According to Embodiment)

Figure 9:
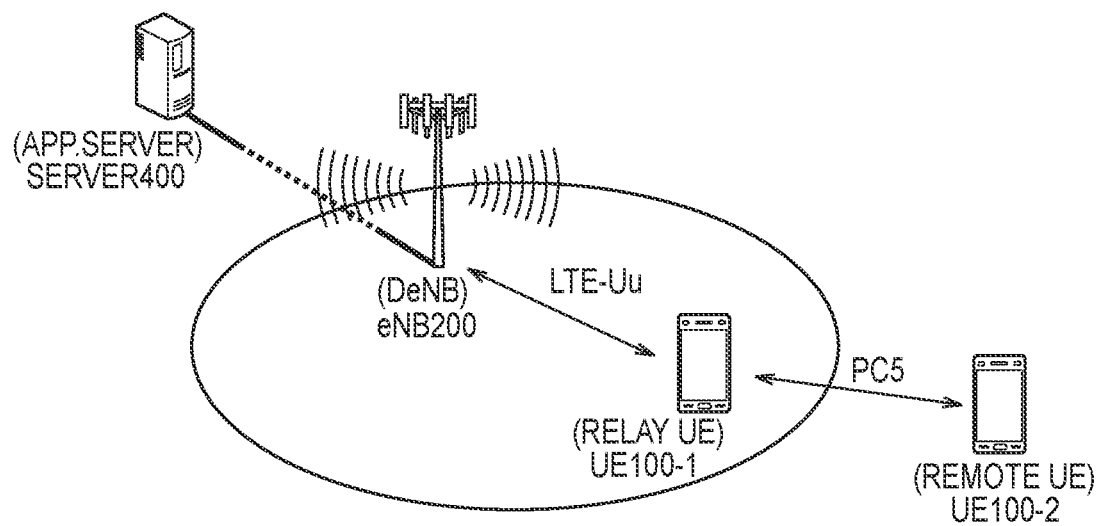
FIG. 9 is a diagram for describing an operation environment according to an embodiment.

Next, an operation environment according to the embodiment will be described by using FIG. 9. FIG. 9 is a diagram for describing an operation environment according to the embodiment.

As illustrated in FIG. 9, a UE 100-1 is located in a cell managed by the eNB 200 (DeNB), and can perform cellular communication (LTE-Uu) with the eNB 200. The UE 100-1 is in an RRC connected state. Alternatively, if performing communication with the eNB 200, the UE 100-1 in an RRC idle state may shift from the RRC idle state to the RRC connected state. Alternatively, if receiving MBMS traffic, the UE 100-1 may be in an RRC idle state. On the other hand, a UE 100-2 is located outside the cell managed by the eNB 200. The UE 100-2 is in an RRC idle state.

The UE 100-1 is a relay UE (ProSe UE-to-NW Relay) and the UE 100-2 is a remote UE. The UE 100-1 and the UE 100-2 execute a UE-to-Network relay on a PC5.

The eNB 200 is a donor eNB configured to relay data of the remote UE. The eNB 200 receives MBMS traffic (an MBMS service) from the Server 400. The Server 400 is, for example, a group communication application server configured to provide, as MBMS traffic, data related to group communication for public safety purposes.

A connection for a UE-to-Network relay is established between the eNB 200 and the UE 100-1. Further, a connection for the UE-to-Network relay is established between the UE 100-1 and the UE 100-2.

In such operation environment, the following operations are executed for reducing unnecessary signaling if relaying MBMS traffic to the remote UE by the UE-to-Network relay.

It is noted that the below-described process (operation) executed by the UE 100 (UE 100-1/UE 100-2) is executed by at least one of the receiver 110, the transmitter 120, and the controller 130 included in the UE 100, however, it is described as a process executed by the UE 100 for the purpose of convenience. Similarly, the below-described process (operation) executed by the eNB 200 is executed by at least one of the receiver 210, the transmitter 220, the controller 230, and the network interface 240 included in the eNB 200, however, it is described as a process executed by the eNB 200 for the purpose of convenience.

(Operation According to Embodiment)

Figure 10:
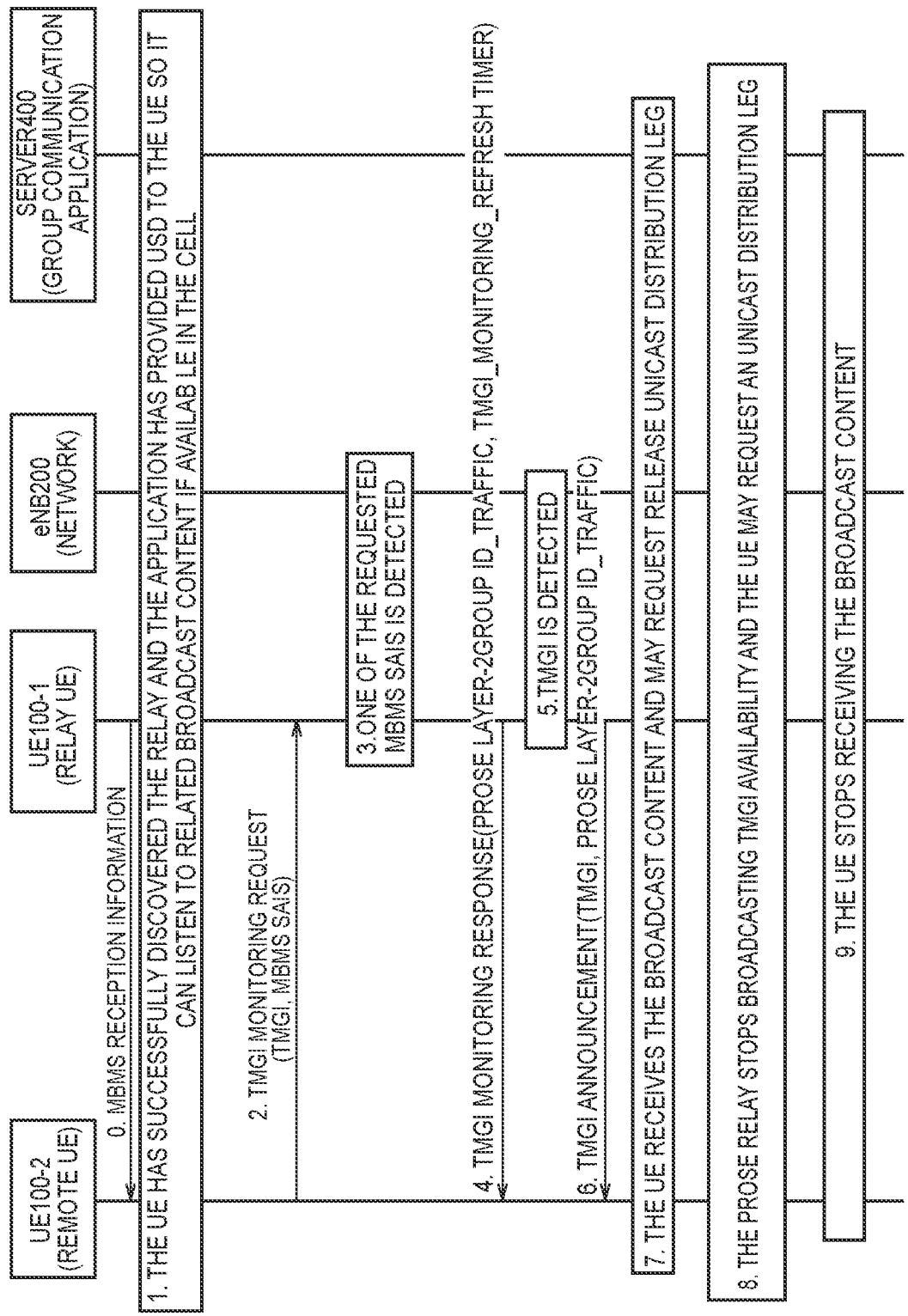
FIG. 10 is a sequence diagram for describing an operation according to the embodiment.
Figure 11:
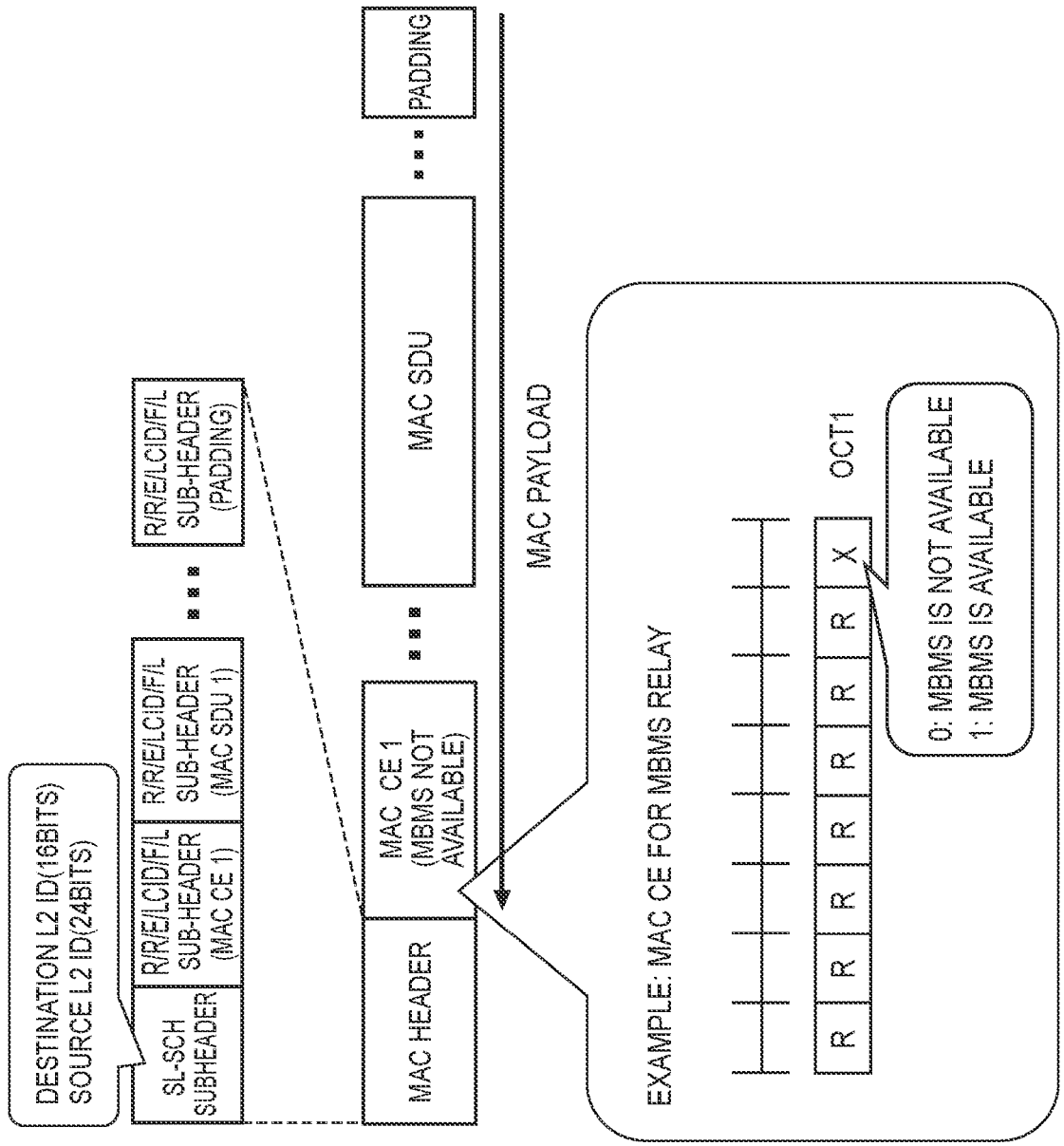
FIG. 11 is a sequence diagram for describing an operation according to the embodiment.
Figure 12:
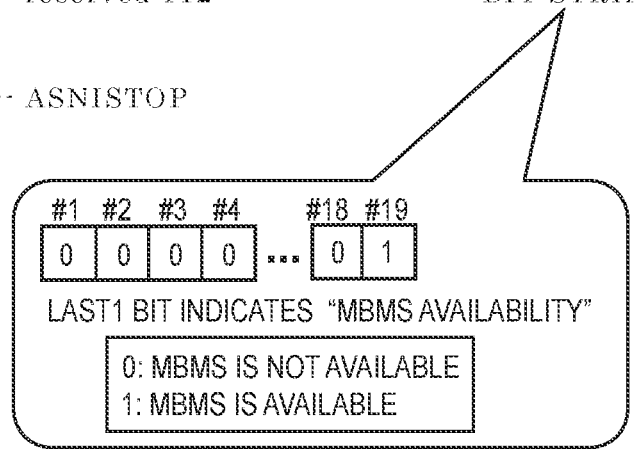
FIG. 12 is a sequence diagram for describing an operation according to the embodiment.

Next, an operation according to the embodiment will be described by using FIG. 10 to FIG. 12. FIG. 10 to FIG. 12 are sequence diagrams for describing an operation according to the embodiment. FIG. 10 is a diagram for describing a procedure to request a relay UE to monitor a specific available TMGI by a remote UE and to request the relay UE to broadcast the TMGI.

As illustrated in FIG. 10, in step S0, the UE 100-1 transmits, to the remote UE, MBMS reception information related to whether or not the UE 100-1 can receive MBMS traffic (an MBMS service).

The UE 100-1 can transmit MBMS reception information by unicast or broadcast. Specifically, the UE 100-1 can transmit, by unicast, MBMS reception information by at least one of NAS level signaling, RRC signaling, and a MAC control element (MAC CE). The UE 100-1 may transmit, by unicast, MBMS reception information when performing setting (connection) of a UE-to-Network relay with a remote UE. For example, as illustrated in FIG. 11, the UE 100-1 includes, in the MAC CE, information (1 bit indicator) indicating whether or not the MBMS service is available. When the information indicates that the MBMS service is available ("1"), the remote UE determines that the UE 100-1 (relay UE) is capable of receiving MBMS traffic. On the other hand, if the information indicates that the MBMS service is not available ("0"), the remote UE determines that the UE 100-1 (relay UE) is not capable of receiving MBMS traffic.

Further, the UE 100-1 can transmit, by broadcast, MBMS reception information by at least one of Direct Discovery (relay discovery) and an MIB for a side link (MasterInformationBlock-SL). For example, as illustrated in FIG. 12, the UE 100-1 includes information (BIT STRING #19) indicating whether or not the MBMS service is available into the MasterInformationBlock-SL. The remote UE determines, based on the information, whether or not the UE 100-1 (relay UE) can receive the MBMS traffic. It is noted that the MasterInformationBlock-SL includes information transmitted via SL-BCH by a UE configured to transmit an SLSS functioning as a synchronization standard. The SLSS (Sidelink Synchronisation Signal) is a synchronization signal for a sidelink.

The MBMS reception information is information indicating an MBMS service reception state of the UE 100-1 or the capability of the UE 100-1 to receive the MBMS service. For example, the UE 100-1 can transmit MBMS reception information indicating that the MBMS service cannot be received if a serving cell of the UE 100-1 (the eNB 200) does not provide the MBMS service. The UE 100-1 may transmit MBMS reception information indicating that the MBMS service cannot be received if not only the serving cell but also another cell different from the serving cell does not provide the MBMS service.

It is noted that, the UE 100-1 may transmit MBMS reception information indicating that the MBMS service cannot be received, if the MBMS service cannot be received when simultaneously executing cellular communication and direct communication (UE-to-Network relay) in a different frequency band, even if another cell provides the MBMS service.

On the other hand, the UE 100-1 can transmit MBMS reception information indicating that the MBMS service can be received if the serving cell provides the MBMS service. The UE 100-1 may transmit MBMS reception information indicating that the MBMS service can be received if another cell different from the serving cell provides the MBMS service even if the serving cell does not provide the MBMS service.

Further, the MBMS reception information may be the number of predetermined identifiers received by the UE 100-1. The predetermined identifier is at least one of an identifier (TMGI: Temporary Mobile Group Identity) for identifying the MBMS service and identifiers (SAI: MBMS service area identities) for identifying an area for distributing the MBMS service. The TMGI is an identifier associated with specific contents. The SAI indicates an area (MBMS service area) for distributing the contents of the MBMS service. It can be determined that the reception state of the MBMS service is favorable in the relay UE (or reception capability of the relay UE is high) as the number of the predetermined identifiers is larger.

Further, the MBMS reception information may be information on a frequency band which the UE 100-1 can monitor, the frequency band being for providing an MBMS service. The information on the frequency band may be information indicating the number of frequency bands (carriers) for providing the MBMS service, and information indicating the frequency band (carrier). It can be determined that the reception state of the MBMS service is favorable in the relay UE as the number of the predetermined identifiers is larger. It can be determined that the reception state of the MBMS service is favorable in the relay UE (or reception capability of the relay UE is high) as the number of frequency bands (carriers) is larger.

Further, MBMS reception information may be information indicating the reception quality of the MBMS service. For example, the information is information indicating at least one of the received signal strength (RSRP) and the received signal quality (RSRQ) of a cell providing the MBMS service.

The UE 100-2 being a remote UE can determine whether to select the UE 100-1 as a relay UE, based on MBMS reception information from the UE 100-1 being a relay UE. For example, the UE 100-2 being interested in MBMS reception does not select the UE 100-1 as a relay UE if the UE 100-1 cannot receive the MBMS service. Further, if the reception state of the MBMS service of the UE 100-1 is poor or the MBMS reception capability of the UE 100-1 is low, the UE 100-2 does not select the UE 100-1 as a relay UE. Therefore, the UE 100-2 can reduce unnecessary signaling for executing the UE-to-Network relay with the UE 100-1 which may not provide a desirable MBMS service. Furthermore, the UE 100-2 does not need to transmit signaling of step 2 described later to the UE 100-1 which may not provide the desirable MBMS service, and thus, it is possible to reduce unnecessary signaling.

It is noted that, the UE 100-1 can transmit, to the eNB 200 configured to manage the serving cell, capability information on whether or not the UE 100-1 can receive an MBMS service being provided in a frequency band (band/carrier) different from that of the serving cell. The capability information may be information indicating that it is possible to simultaneously execute cellular communication, direct communication (UE-to-Network relay), and MBMS service reception, and may be information indicating a combination of frequency bands in which cellular communication, direct communication (UE-to-Network relay), and MBMS service reception can simultaneously be executed.

The eNB 200 may determine (set) a UE to be a relay UE, based on the capability information. For example, the eNB 200 may more preferentially set, to the relay UE, a UE having high reception capability of the MBMS service than a UE having low reception capability of the MBMS service. Further, the eNB 200 may not select a UE not capable of receiving the MBMS service as the relay UE.

Opportunities for a UE having reception capability of the MBMS service to function as the relay UE increases, and thus, possibility of the relay UE being able to receive MBMS traffic increases. Further, even if the MBMS service is not provided in the serving cell, if the MBMS service is provided in another cell, possibility of the relay UE being able to receive MBMS traffic increases. Furthermore, possibility of the relay UE being able to receive more MBMS traffic (group communication traffic) becomes higher. As a result, the technology for relaying MBMS traffic to a remote UE by the UE-to-Network relay can be effectively utilized.

In step S1, the UE 100-2 discovers the UE 100-1. The UE 100-2 may discover the UE 100-1, based on reception of MBMS reception information. Thereafter, the UE 100-2 obtains, from the Server 400, USD (User Service Description) that is user service explanation information via the UE 100-1 and the eNB 200. The USD includes a TMGI, a frequency, and an SAI to be used for receiving an associated MBMS service. If located within a cell coverage of the eNB 200, the UE 100-2 may obtain the USD from the eNB 200.

In step S2, the UE 100-2 transmits, to the UE 100-1 interested in receiving the MBMS service, a TMGI monitoring request including a TMGI (value) and an SAI. The TMGI monitoring request is a request for receiving (monitoring) a specific MBMS service indicated by the TMGI.

In step S3, the UE 100-1 receives an SAI list from the eNB 200 (cell), and checks whether the SAI received from the UE 100-2 is included in the SAI list.

In step S4, the UE 100-1 transmits a response to the TMGI monitoring request to the UE 100-2. Upon detecting at least one SAI from the UE 100-2, the UE 100-1 transmits acknowledgment for the TMGI monitoring request to the UE 100-2. The acknowledgment includes a group identifier (Prose Layer 2 Group ID_traffic) and a refresh timer (TMGI_Monitoring_Refresh Timer).

The group identifier is used for transmitting (transferring) the MBMS service (MBMS contents) associated with the TMGI included in the TMGI monitoring request to the remote UE (UE 100-2). The group identifier is an identifier used for transmitting a specific MBMS service. Specifically, the group identifier is an identifier (destination identifier) in which the UE 100-1 indicates the transmission target of the specific MBMS service indicated by the TMGI. The group identifier may be an identifier having information amount (for example, 8 bits) less than that of a group identifier (for example, 24 bits) used for data transmission in a proximity service (Direct Discovery/Direct Communication/UE-to-Network relay). Therefore, the group identifier for MBMS traffic transmission may be an abbreviated identifier. For example, the group identifier may be a group identifier of an LSB (8 bits) utilized in the control information (PSCCH).

The refresh timer is a timer to be a trigger of the TMGI monitoring request. If the refresh timer expires when it is still necessary for the UE 100-2 to monitor the TMGI (that is, if the time indicated by the refresh timer elapses), the UE 100-2 executes the TMGI monitoring request. If the UE 100-2 (and another UE) does not execute the TMGI monitoring request procedure when the refresh timer expires, the UE 100-1 ends the monitoring of the TMGI.

In step S5, the UE 100-1 detects the TMGI which is requested to be monitored. The UE 100-1 starts monitoring (reception) of the MBMS service indicated by the detected TMGI.

In step S6, in response to the detection of the TMGI, the UE 100-1 sends, to the UE 100-2, a TMGI announcement message including an effective TMGI and a corresponding group identifier by broadcast. The UE 100-1 can send the TMGI announcement message by the Direct Discovery. The UE 100-1 may repeatedly transmit the TMGI announcement message in a cycle shorter than the refresh timer. Further, the UE 100-1 transmits MBMS traffic (an MBMS service) associated with the group identifier on the side link associated with the group identifier by broadcast. The UE 100-1 may transmit the MBMS traffic by unicast.

In step S7, the UE 100-2 detects the announcement in step S6 and starts reception of the broadcast contents on the sidelink associated with the group identifier. The UE 100-2 may transmit, to the UE 100-1, a request to release distribution by unicast.

In step S8, if the TMGI cannot be detected from the network, the UE 100-1 ends broadcast of the effective TMGI. Further, the UE 100-1 ends transmission (relay) of MBMS traffic.

In step S9, the UE 100-2 ends reception of MBMS traffic by broadcast on the sidelink associated with the group identifier.

(First Modification)

Next, a first modification of the embodiment will be described.

In the embodiment described above, if receiving the TMGI monitoring request, the UE 100-1 transmits a response to the request to the UE 100-2 (refer to step 4).

However, instead of the response, the UE 100-1 may transmit a message (TMGI announcement message) including a TMGI included in the TMGI monitoring request and a group identifier corresponding to the TMGI by broadcast. That is, the UE 100-1 may omit transmission of response in step S4. Further, the UE 100-1 may include a refresh timer into the TMGI announcement message.

The UE 100-2 can consider the TMGI announcement message as a response to the request. The UE 100-1 does not need to transmit a response to the TMGI monitoring request, and thus, unnecessary signaling can be reduced.

It is noted that, if receiving a TMGI announcement message including a TMGI desired by another remote UE, the other remote UE may omit transmission of a TMGI monitoring request.

Further, if transmitting a TMGI for identifying each of a plurality of specific MBMS services, the UE 100-1 may use a common identifier as an identifier of a transmission source.

Further, similarly to the first embodiment, the UE 100-1 may use, as the group identifier included in the TMGI announcement message, an identifier having information amount less than that of a group identifier used for data transmission in the proximity service. Therefore, the size of the TMGI announcement message can be smaller, and thus, it is possible to reduce a radio resource amount to be used for transmitting the TMGI announcement message.

(Second Modification)

Figure 13:
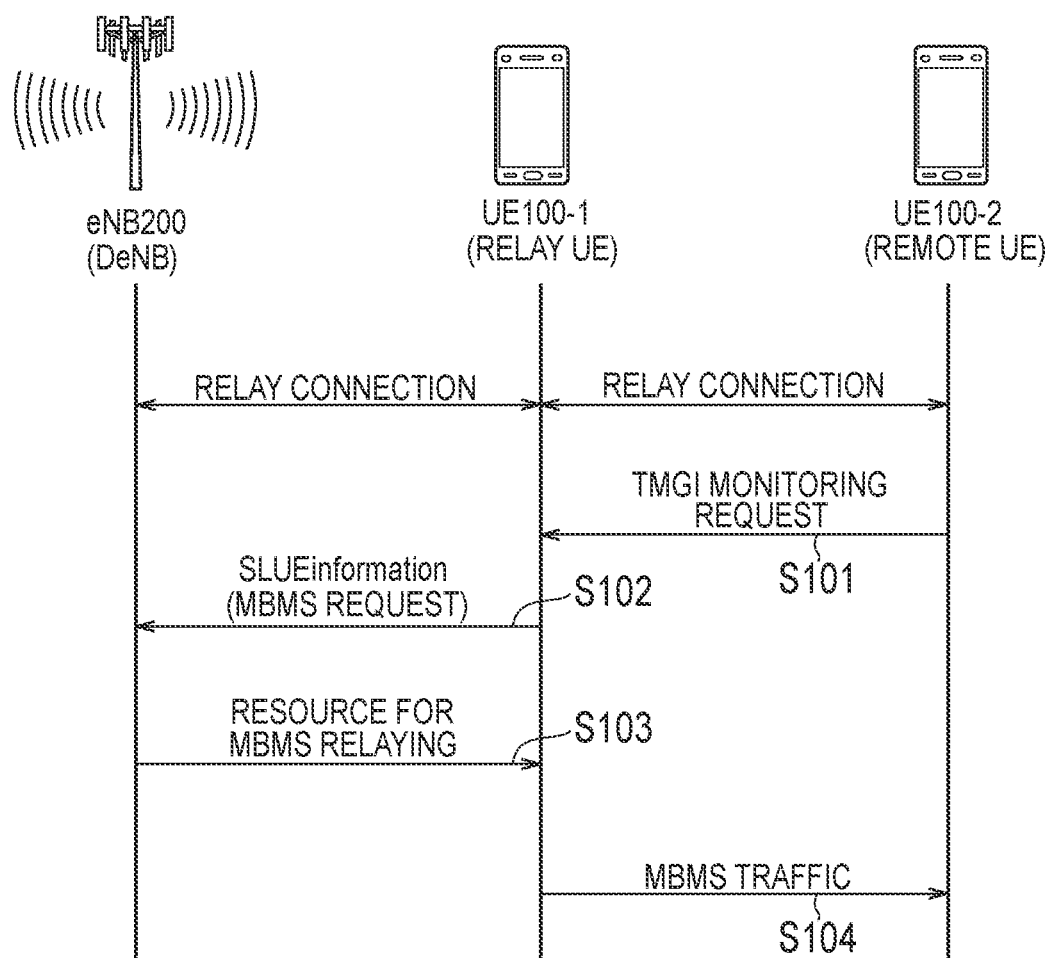
FIG. 13 is a sequence diagram for describing an operation according to a second modification of the embodiment.

Next, a second modification of the embodiment will be described by using FIG. 13. FIG. 13 is a sequence diagram for describing an operation according to the second modification of the embodiment.

In the second modification, a radio resource used for transmitting (relaying) the MBMS service will be described. It is noted that, description of portions similar to the above-described embodiment and the first modification will be omitted where appropriate.

As illustrated in FIG. 13, in step S101, the UE 100-2 transmits the TMGI monitoring request to the UE 100-1.

In step S102, the UE 100-1 determines that relaying of the MBMS service is requested from the remote UE by the TMGI monitoring request. The UE 100-1 requests the eNB 200 to provide a radio resource for relaying the MBMS service. For example, the UE 100-1 uses an SLUE information message (SL UE information) to request the eNB 200 to provide the radio resource. The SLUE information message is a message used if the UE is interested in the proximity service (such as Direct Discovery, Direct Communication, and UE-to-Network relay), for example.

The eNB 200 allocates the radio resource for relaying the MBMS service to the UE 100-1, in response to the request of the radio resource from the UE 100-1. Here, the eNB 200 can allocate a second radio resource different from a first radio resource used in a normal UE-to-Network relay. The eNB 200 can allocate the second radio resource for multicast or broadcast instead of the first radio resource for unicast.

The second radio resource is a radio resource available for a longer duration than the first radio resource, for example. The eNB 200 may transmit, to the UE 100-1, information for specifying a duration of the second radio resource along with allocation information of the second radio resource. The information for the specification is, for example, information indicating an absolute time (for example, a timer), information indicating the number of cycles of the transmission resource pool to which the second radio source amounts.

In step S103, the eNB 200 transmits, to the UE 100-1, allocation information of the radio resource (second radio resource) used for relaying the MBMS service.

In step S104, the UE 100-1 uses the radio resource to relay (transmit) the MBMS service (MBMS traffic) to the remote UE, based on the allocation information of the radio resource.

(Third Modification)

Figure 14:
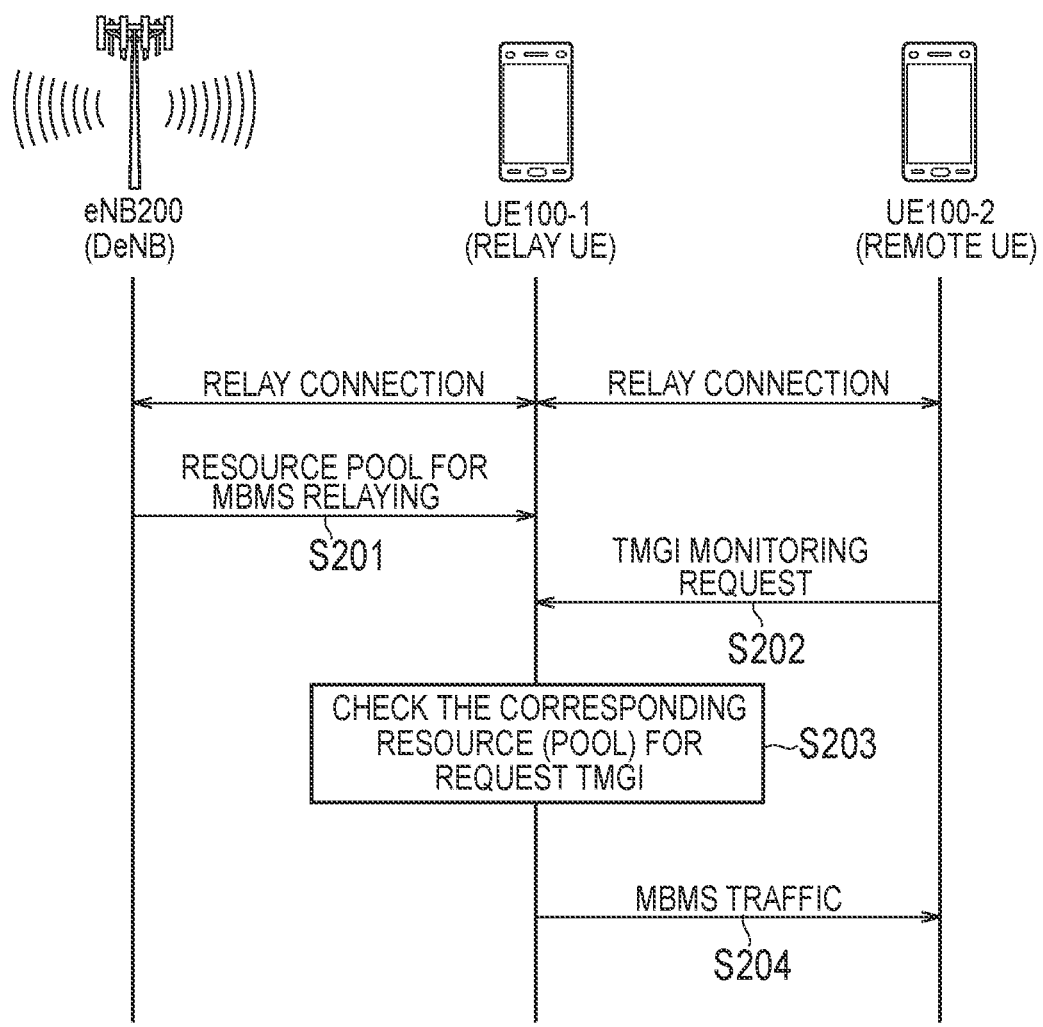
FIG. 14 is a sequence diagram for describing an operation according to a third modification of the embodiment.

Next, a third modification of the embodiment will be described by using FIG. 14. FIG. 14 is a sequence diagram for describing an operation according to the third modification of the embodiment.

In the second modification, the UE 100-1 requests the eNB 200 to provide a radio resource used for transmission (relaying) of the MBMS service. The present third modification is a case where the UE 100-1 does not request the eNB 200 to provide the radio resource used for transmission (relaying) of the MBMS service. It is noted that, description of portions similar to the above-described embodiment and each modification will be omitted where appropriate.

As illustrated in FIG. 14, in step S201, the eNB 200 transmits transmission resource pool information to the UE 100-1. The eNB 200 may transmit, to the relay UE, the transmission resource pool information by unicast (for example, an RRC signaling) and by broadcast (for example, an SIB (System Information Block)). The transmission resource pool herein is a resource pool to which a radio resource used for relaying the MBMS service by the UE-to-Network relay is arranged.

The eNB 200 may transmit transmission resource pool information corresponding to each MBMS traffic to the UE 100-1. Specifically, the eNB 200 transmits, to the UE 100-1, information in which each MBMS traffic being distributed and the corresponding transmission resource pool are associated in a predetermined frequency by broadcast (for example, an SIB 13). The information may be information associating the TMGI and the transmission resource pool.

Step S202 corresponds to step S101.

In step S203, the UE 100-1 checks the transmission resource pool (radio resource) corresponding to the requested TMGI. Specifically, the UE 100-1 specifies (MBMS traffic corresponding to) the TMGI received from the UE 100-2. The UE 100-1 selects a transmission resource pool corresponding to the specified TMGI (MBMS traffic), based on the transmission resource pool information.

Step S204 corresponds to step S104. The UE 100-1 uses a predetermined radio resource from the selected transmission resource pool to relay the MBMS traffic.

Other Embodiments

The contents of the present application are described through each of the above-described embodiments, but it should not be understood that the discussion and the drawings constituting a part of this disclosure limit to the contents of the present application. From this disclosure, various alternative embodiments, examples, and operational technologies will become apparent to those skilled in the art.

Although not particularly mentioned in each of the above-described embodiments, a program for causing a computer to execute each process performed by any one of the above-described nodes (such as the UE 100 and the eNB 200) may be provided. Furthermore, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a CD-ROM and a DVD-ROM, for example.

Alternatively, a chip may be provided which is configured by: a memory configured to store a program for performing each process performed by any one of the UE 100 and the eNB 200; and a processor configured to execute the program stored in the memory).

In the above-described embodiment, although the LTE system is described as an example of the mobile communication system, it is not limited to the LTE system, and the present application may be applied to a system other than the LTE system.

The entire content of Japanese Patent Application No. 2015-159480 (filed on Aug. 12, 2015) is incorporated in the present specification by reference.

INDUSTRIAL APPLICABILITY

The present application is useful in the field of radio communication.

The invention claimed is:

1. A relay user equipment configured to provide a UE-to-Network relay function in a proximity service, the relay user equipment comprising:
a controller configured to:
receive a reception request of a specific Multimedia Broadcast Multicast Service (MBMS) service from a remote user equipment configured to communicate with a network via the relay user equipment, the reception request including an identifier of an MBMS service area;
transmit to the remote user equipment, in response to receiving the reception request and after checking the identifier of the MBMS service area with the network, information indicating a timer to be a trigger of the reception request of the specific MBMS service; and
transmit a message including a first identifier for identifying the specific MBMS service and a group identifier used for data transmission in the proximity service, by broadcast.

2. A remote user equipment configured to communicate with a network via a relay user equipment that provides a UE-to-Network relay function in a proximity service, the remote user equipment comprising:
a controller configured to:
transmit a reception request of a specific Multimedia Broadcast Multicast Service (MBMS) service to the relay user equipment, the reception request including an identifier of an MBMS service area;
receive, from the relay user equipment, information indicating a timer to be a trigger of the reception request of the specific MBMS service, wherein the identifier of the MBMS service area is checked by the relay user equipment with the network; and
receive from the relay user equipment, a message including a first identifier for identifying the specific MBMS service and a group identifier used for data transmission in the proximity service.

3. A method used in a relay user equipment configured to provide a UE-to-Network relay function in a proximity service, the method comprising:
receiving a reception request of a specific Multimedia Broadcast Multicast Service (MBMS) service from a remote user equipment configured to communicate with a network via the relay user equipment, the reception request including an identifier of an MBMS service area;

transmitting to the remote user equipment, in response to receiving the reception request and after checking the identifier of the MBMS service area with the network, information indicating a timer to be a trigger of the reception request of the specific MBMS service; and transmitting a message including a first identifier for identifying the specific MBMS service and a group identifier used for data transmission in the proximity service, by broadcast.

* * * * *